Aug. 12, 1958 — J. A. TWO — 2,847,088

BRAKE DRUM LINING

Filed Jan. 4, 1954

Inventor
Joseph A. Two

2,847,088
BRAKE DRUM LINING

Joseph A. Two, Rockford, Ill., assignor of one-fourth to Clarence B. Paden, one-fourth to Francis W. Gaffney, and one-fourth to Clarence J. McCue, all of Rockford, Ill.

Application January 4, 1954, Serial No. 401,927

7 Claims. (Cl. 188—218)

This invention relates to a new and improved brake drum lining and has for its principal object the provision of a radially expansible and contractible split spring steel band that is adapted to be contracted for entry inside a drum after which the expansibility of the band asserts itself and serves to make the band hug the inside of the drum, thereby giving the same dependable brake drum lining as where the lining is applied directly to the drum, while yet permitting removal of the lining with the band for easier and more economical replacement of the lining when worn.

The drum, in accordance with my invention, is provided with a transversely extending slot in the rim thereof between the inner and outer edges into which radially outwardly bent ends of the band engage to hold the band and therefore the lining that is bonded thereto against turning with respect to the drum. There are also circumferentially extending lugs provided on the band which project radially from the outer side thereof and these are received in registering slots provided in the drum to hold the band against axial displacement with respect to the drum. Any relatively unskilled filling station attendant or garage mechanic acquainted with the construction can readily remove the band when the lining becomes worn and it becomes necessary to replace it with a new one. The necessity for replacement can be easily checked when the wheel is removed for lubrication and hence the two jobs can be taken care of at one time with a saving in cost.

The invention is illustrated in the accompanying drawing, in which—

Figure 2:
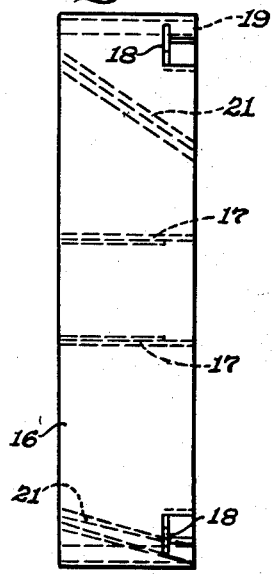
Figure 1:
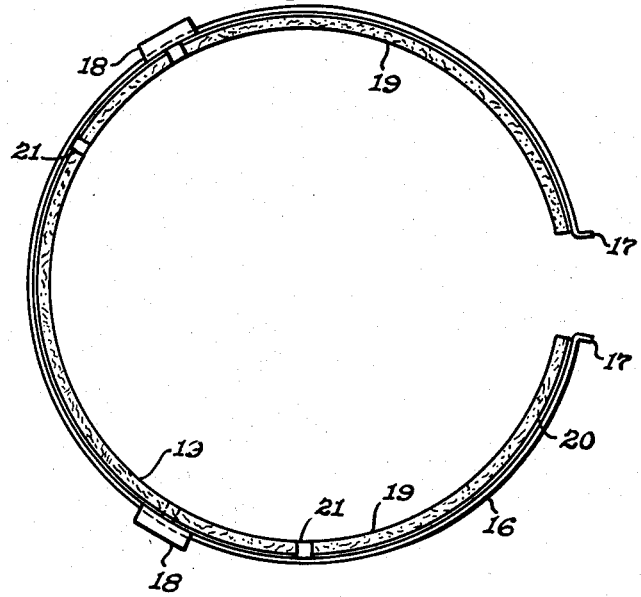
Figure 4:
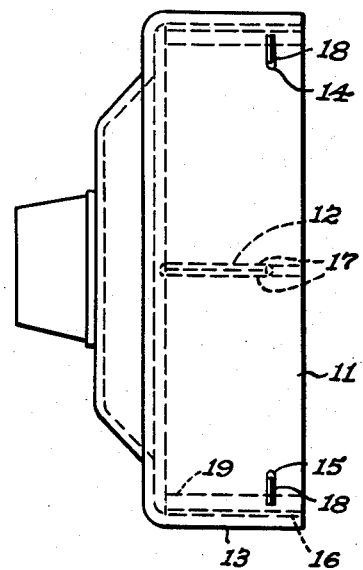
Figure 3:
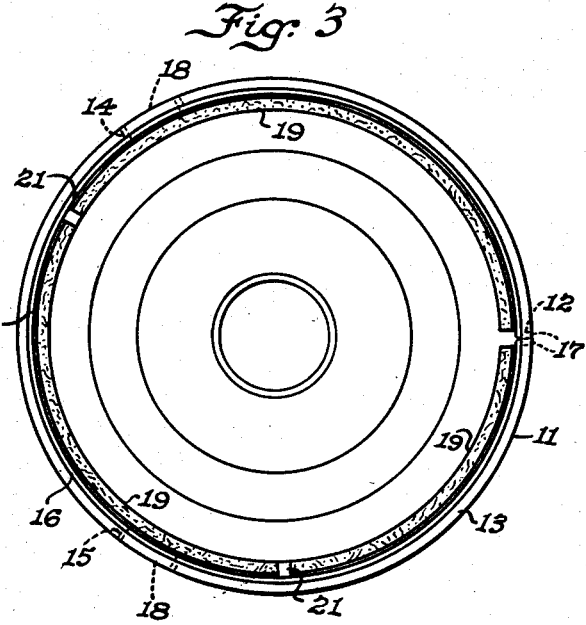

Figs. 1 and 2 are an edgewise and sidewise view of a removable and replaceable band made in accordance with my invention carrying on its inner periphery a brake drum lining, and Figs. 3 and 4 are views similar to Figs. 1 and 2 showing the band installed in a brake drum specially constructed to receive it.

The same reference numerals are applied to corresponding parts throughout these views.

Motor vehicle brakes now in use generally have the brake linings attached to internal expansible brake bands or shoes which are stationarily mounted and have the brake drums turn with respect thereto. There are serious objections to that arrangement, one being that the drums get overheated and distorted and it is therefore necessary to provide heat radiating flanges on the outer peripheries thereof for cooling, and these drums, in the case of trucks that are driven on long hauls requiring frequent applications of the brakes, require frequent machining to true them up. In accordance with my invention, therefore, the linings are applied instead to the inside of the drums and the brake shoes work on these linings, thereby avoiding the objectionable overheating of the drums. The linings, instead of being applied directly to the inside of the drums, are applied to removable and replaceable bands. When the linings become worn the bands carrying the same are removed and new bands with new linings are inserted. When the shoes become worn it costs very little to replace them as compared with the cost of replacing the drums with the old arrangement, and there is no longer the necessity for machining the drums to keep them trued up, so that the operation of the brakes is generally improved and maintenance and replacement costs are reduced to a minimum.

As previously indicated, the improvement here is partly in the drum and partly in the lining, which is readily removable and replaceable. The drum 11 has a slot 12 extending transversely of the inner side of the rim 13 between the inner and outer edges thereof, as clearly appears in Fig. 4, and there are two other slots 14 and 15 provided in the rim 13 extending circumferentially thereof 120° apart and both spaced 120° from the slot 12. The lining is carried on a steel band 16 that is of approximately the same circumferential extent as the inside of the rim 13 and has outwardly bent ends 17 that are adapted to be received in the slot 12, as clearly indicated in Figs. 3 and 4. The band 16, before its insertion in the drum, has its outwardly bent ends 17 spaced apart, as shown in Fig. 1, and it is therefore necessary to contract or compress the band to insert it in the drum, after which the expansibility of the band asserts itself and causes the band to hug the inside of the rim 13. The outwardly bent ends 17 engaging in the slot 12 hold the band against turning with respect to the drum. The band also has bent from one edge portion thereof two lugs 18, as best appears in Fig. 2, and these lugs are slightly shorter than the slots 14 and 15 in the rim 13 and are spaced 120° apart and 120° from the ends 17 to register with slots 14 and 15 and be engageable therein, as shown in Figs. 4 and 5, so as to hold the band 16 against axial displacement with respect to the drum.

The band 16 carries on its inner side a lining 19 made up of three sections bonded in place by a suitable cement, as indicated at 20 in Figs. 1 and 3. The ends of the sections of lining are cut on a bias and the ends are spaced, as indicated at 21, so that these spaces are at an angle to the axis of rotation to serve as what are known as "slinger" slots, the function of which is to throw out any dirt that might otherwise collect in these spaces, the slots extending in the appropriate direction with respect to the normal direction of rotation of the drums to insure outward rather than inward movement of the dirt. The spacing of the sections of lining 19 is also of advantage from the standpoint of enabling the band 16 to be inserted and removed more easily, by virtue of the greater ease with which the band may be flexed.

In operation, when the lining 19 becomes worn the band 16 is removed and the new band of the same construction with a new lining bonded therein is inserted, and this replacement operation takes only a small fraction of the time otherwise involved in replacing brake linings with other constructions. Due to the fact that the lining 19 is inside the band 16 and the band 16 is applied to the inside of the rim 13 of the drum there is no objectionable overheating and consequent distortion of the drum and the drum can, therefore, be of pressed steel construction, like that shown at 11, instead of being of a more expensive cast construction with heat radiating flanges thereon. With the present construction, there is, therefore, no need for machining the drums to true them up. The brake shoes (not shown) work on the linings 19 and when the shoes become worn they can be replaced at very little expense compared with replacing the drums with the old construction.

It is believed the foregoing description conveys a good understanding of the objects and advantages of my invention. The appended claims have been drawn to cover all legitimate modifications and adaptations.

I claim:

1. In combination, a brake drum having a circumferentially extending brake rim portion in the inner side of which is provided a transversely extending recess between the inner and outer edges thereof and terminating short of the outer edge, a circular spring metal band that is split transversely at one point of its circumference and when removed from the rim portion is of larger radius than the inside radius of said brake rim portion but is resiliently radially compressible to be inserted in the rim portion and expansible to fit closely but removably within said rim portion with said transversely split portion disposed in register radially with said recess, said band having at said transversely split portion radially outwardly extending projections on and transversely of the separable ends of the band entered in said recess and serving to hold said band releasably against turning with respect to said drum in either direction, and brake lining secured to the inner periphery of said band and removable with it from said drum.

2. In combination, a brake drum having a circumferentially extending brake rim portion in the inner side of which is provided a transversely extending recess between the inner and outer edges thereof, a circular spring metal band that is split transversely at one point of its circumference and when removed from the rim portion is of larger radius than the inside radius of said brake rim portion but is resiliently radially compressible to be inserted in the rim portion and expansible to fit closely but removably within said rim portion with said transversely split portion disposed in register radially with said recess, said band having at said transversely split portion radially outwardly extending projections on and transversely of the separable ends of the band entered in said recess and serving to hold said band releasably against turning with respect to said drum in either direction, and brake lining secured to the inner periphery of said band and removable with it from said drum, there being at least one circumferentially extending recess provided in the inner side of said brake rim portion between the inner and outer edges thereof, said band having in register radially with said circumferential recess a radially outwardly extending projection disposed in said recess and serving to hold said band releasably against lateral displacement with respect to said rim portion in either direction.

3. In combination, a brake drum having a circumferentially extending brake rim portion, a circular spring metal band that is split transversely at one point of its circumference and when removed from the rim portion is of larger radius than the inside radius of said brake rim portion but is resiliently radially compressible to be inserted in the rim portion and expansible to fit closely but removably within said rim portion and brake lining secured to the inner periphery of said band and removable with it from said drum, there being at least one circumferentially extending recess provided in the inner side of said brake rim portion between the inner and outer edges thereof, said band having between the lateral edges thereof in register radially with said circumferential recess a radially outwardly extending projection entered in said recess, whereby said band is held against turning with respect to said drum and against displacement laterally therefrom.

4. In combination, a brake drum having a circumferentially extending brake rim portion in the inner side of which is provided a transversely extending recess between the inner and outer edges thereof and terminating short of the outer edge, a circular spring metal band that is split transversely at one point of its circumference and when removed from the rim portion is of larger radius than the inside radius of said brake rim portion but is resiliently radially compressible to be inserted in the rim portion and expansible to fit closely but removably within said rim portion with said transversely split portion disposed in register radially with said recess, said band having at said transversely split portion radially outwardly extending projections on and transversely of the separable ends of the band entered in said recess and serving to hold said band resiliently against turning with respect to said drum, there being a plurality of circumferentially extending recesses provided in the inner side of said brake rim portion in circumferentially spaced relation to one another and to said transversely extending recess and between the inner and outer edges of said brake rim portion, said band having between the lateral edges thereof in register radially with said circumferential recesses radially outwardly extending projections entered in said recesses, whereby said band is held against lateral displacement with respect to said drum, and brake lining secured to the inner periphery of said band and removable with it from said drum.

5. As an article of manufacture, a brake drum for use with a removable brake lining carried on a circular spring metal band that is split transversely at one point of its circumference and when removed from the rim portion of the drum is of larger radius than the inside radius of said rim portion but is resiliently radially compressible for insertion in said rim portion and expansible to fit closely but removably therein, said band having radially outwardly extending projections on and transversely of the separable ends of the band for entry in a transverse recess in the rim portion of said drum, said band also having a circumferentially extending radially outwardly reaching projection intermediate the ends thereof, said drum having a circumferentially extending brake rim portion in the inner side of which is provided a transversely extending recess between the inner and outer edges thereof and terminating short of the outer edge and adapted to receive the radially outwardly extending projections on the separable ends of the band, and said drum also including in circumferentially spaced relation to said transverse recess and in a plane in transverse relation to said transverse recess at least one circumferentially extending recess provided in the inner side of said rim portion adapted to receive the circumferentially extending projection on said band.

6. In combination, a brake drum having a circumferentially extending brake rim portion in the inner side of which is provided a transversely extending recess between the inner and outer edges thereof and terminating short of the outer edge, a circular spring metal band that is split transversely at one point of its circumference and when removed from the rim portion is of larger radius than the inside radius of said brake rim portion but is resiliently radially compressible to be inserted in the rim portion and expansible to fit closely but removably within said rim portion with said transversely split portion disposed in register radially with said recess, said band having at said transversely split portion radially outwardly extending projections on and transversely of the separable ends of the band entered in said recess and serving to hold said band releasably against turning with respect to said drum in either direction, and brake lining secured to the inner periphery of said band and removable with it from said drum, there being two circumferentially extending recesses provided in approximately 120° circumferentially spaced relation in the inner side of said brake rim portion, both spaced approximately 120° from said transversely extending recess and between the inner and outer edges of said brake rim portion, said band having in register radially with each of said circumferential recesses a radially outwardly extending projection, said projections being disposed in said recesses and serving to hold said band releasably against lateral displacement with respect to said brake rim portion in either direction.

7. As an article of manufacture, a removable and replaceable brake drum liner for use with a brake drum having a circumferentially extending brake rim portion in the inner side of which is provided a transversely extending recess and also a circumferentially extending recess in circumferentially spaced relation to said transverse recess, said liner comprising a circular spring metal band that is split transversely at one point of its circumference and when removed from said brake rim portion is of larger radius than the inside radius of said brake rim portion but is resiliently radially compressible to be insertible in said rim portion and expansible to fit closely but removably within said rim portion with said transversely split portion disposed in register radially with said recess, said band having short radially outwardly bent ends transversely thereof adapted to be received in the transversely extending recess in said brake rim portion and having in circumferentially spaced relation to these outwardly bent ends and between the lateral edges of the band at least one radially outwardly bent lug extending circumferentially of the band and adapted to be entered in the circumferentially extending recess in said brake rim portion, said band having brake lining secured to the inner periphery thereof.

References Cited in the file of this patent

UNITED STATES PATENTS

| | | |
|---|---|---|
| 1,300,634 | Moore | Apr. 15, 1919 |
| 1,407,385 | Crumley | Feb. 21, 1922 |
| 1,556,746 | Bartholomew | Oct. 13, 1925 |
| 1,616,659 | Heany | Feb. 8, 1927 |
| 1,678,777 | Hansen et al. | July 31, 1928 |
| 1,907,483 | Blume | May 9, 1933 |
| 1,951,363 | Kopf | Mar. 20, 1934 |
| 2,115,980 | Sinclair | May 3, 1938 |
| 2,631,697 | Bonkowski | Mar. 17, 1953 |